(12) United States Patent
Prendergast

(10) Patent No.: US 12,104,640 B2
(45) Date of Patent: Oct. 1, 2024

(54) WASHERS FOR INDICATING IMBALANCED LOADING AND METHODS OF MAKING THE SAME

(71) Applicant: The Boeing Company, Chicago, IL (US)

(72) Inventor: Matthew L. Prendergast, Covington, WA (US)

(73) Assignee: The Boeing Company, Arlington, VA (US)

(*) Notice: Subject to any disclaimer, the term of this patent is extended or adjusted under 35 U.S.C. 154(b) by 257 days.

(21) Appl. No.: 17/732,827

(22) Filed: Apr. 29, 2022

(65) Prior Publication Data

US 2023/0349415 A1  Nov. 2, 2023

(51) Int. Cl.
| | |
|---|---|
| F16B 43/00 | (2006.01) |
| B33Y 10/00 | (2015.01) |
| B33Y 80/00 | (2015.01) |
| B64C 1/06 | (2006.01) |

(52) U.S. Cl.
CPC .............. *F16B 43/00* (2013.01); *B33Y 10/00* (2014.12); *B33Y 80/00* (2014.12); *B64C 1/06* (2013.01)

(58) Field of Classification Search
CPC ........ F16B 33/004; F16B 39/10; F16B 39/24; F16B 43/00; F16B 43/021; F16B 43/002; F16B 43/009; B33Y 10/00; B33Y 80/00; B64C 1/06
USPC .......................................... 411/531, 538, 542
See application file for complete search history.

(56) References Cited

U.S. PATENT DOCUMENTS

| | | | | |
|---|---|---|---|---|
| 3,606,357 | A | * | 9/1971 | Yonkers ................ F16B 43/001 277/637 |
| 2006/0012132 | A1 | * | 1/2006 | Wu ........................ F16J 15/125 277/628 |
| 2009/0064454 | A1 | * | 3/2009 | Anderson ................. E05D 5/14 16/2.1 |
| 2011/0064539 | A1 | * | 3/2011 | Ghatikar ............. E04F 13/0837 411/371.2 |
| 2017/0335880 | A1 | * | 11/2017 | Prevost ................ F16B 43/001 |
| 2017/0341293 | A1 | * | 11/2017 | Hara ..................... B29C 64/112 |
| 2018/0194079 | A1 | * | 7/2018 | Hardee ................... B33Y 10/00 |
| 2019/0375517 | A1 | * | 12/2019 | Ballocchi ............. B29C 70/003 |
| 2020/0116279 | A1 | * | 4/2020 | Galbreath ............. F16B 35/042 |

* cited by examiner

*Primary Examiner* — Roberta S Delisle
(74) *Attorney, Agent, or Firm* — Hanley, Flight & Zimmerman, LLC

(57) ABSTRACT

Washers for indicating imbalanced loading and methods of making the same are disclosed herein. An example washer includes an outer conical wall having a first end and a second end opposite the first end, and an inner conical wall concentric with the outer conical wall. The inner conical wall is spaced apart from the outer conical wall. The inner conical wall has a first end and a second end opposite the first end. The inner conical wall defines a central bore through the washer. The washer also includes an end wall between the second ends of the outer conical wall and the inner conical wall, such that a cavity is formed between the outer conical wall, the inner conical wall, and the end wall. An opening to the cavity is formed between the first ends. A viscoelastic material is disposed in the cavity that can protrude from the opening.

20 Claims, 14 Drawing Sheets

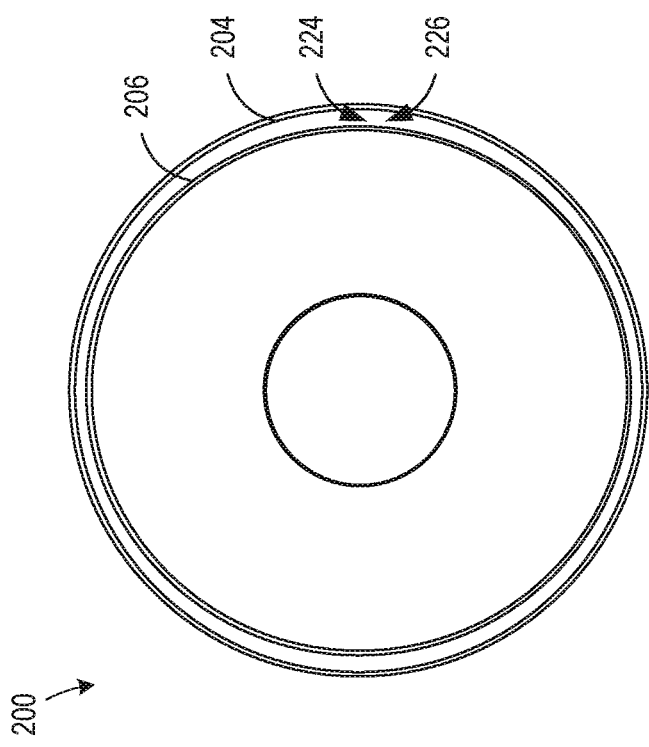
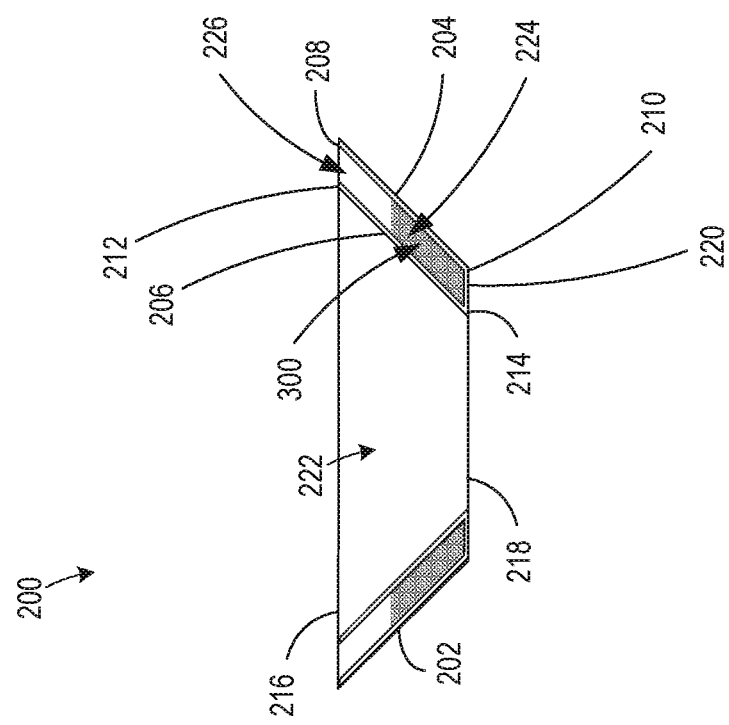

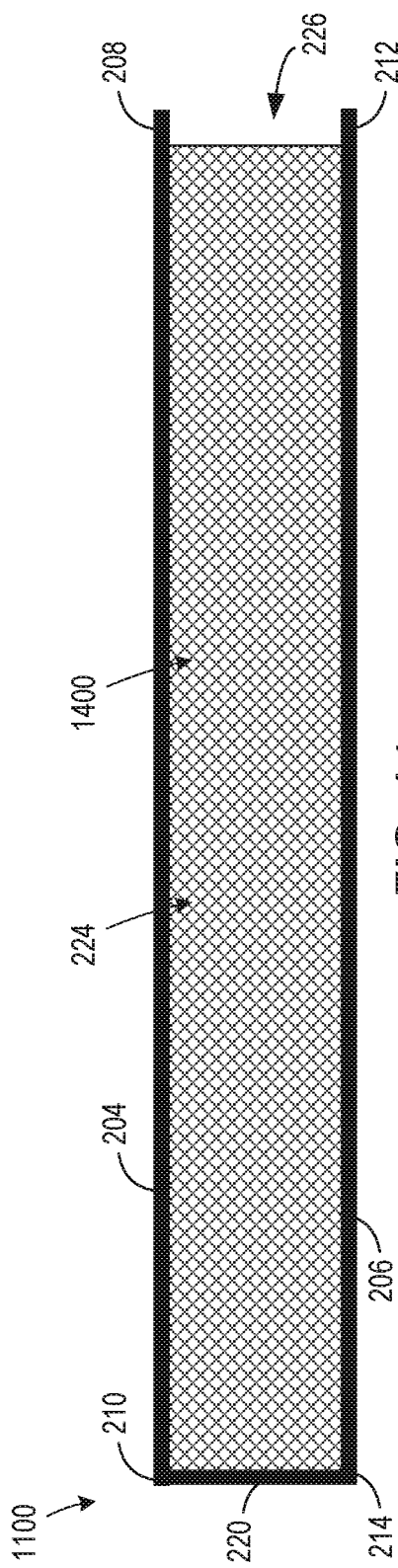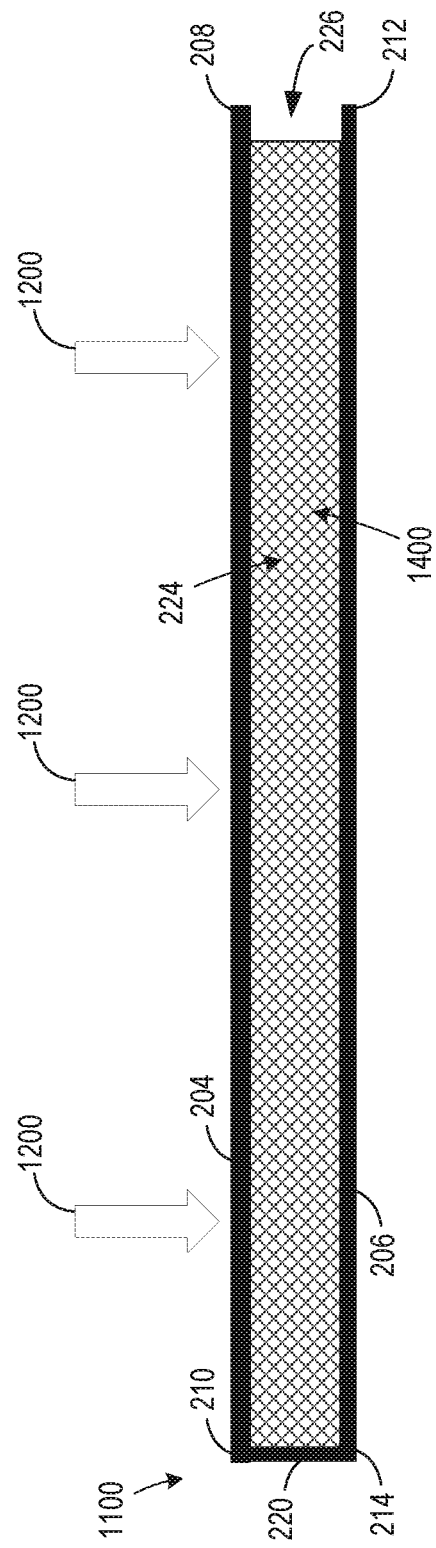

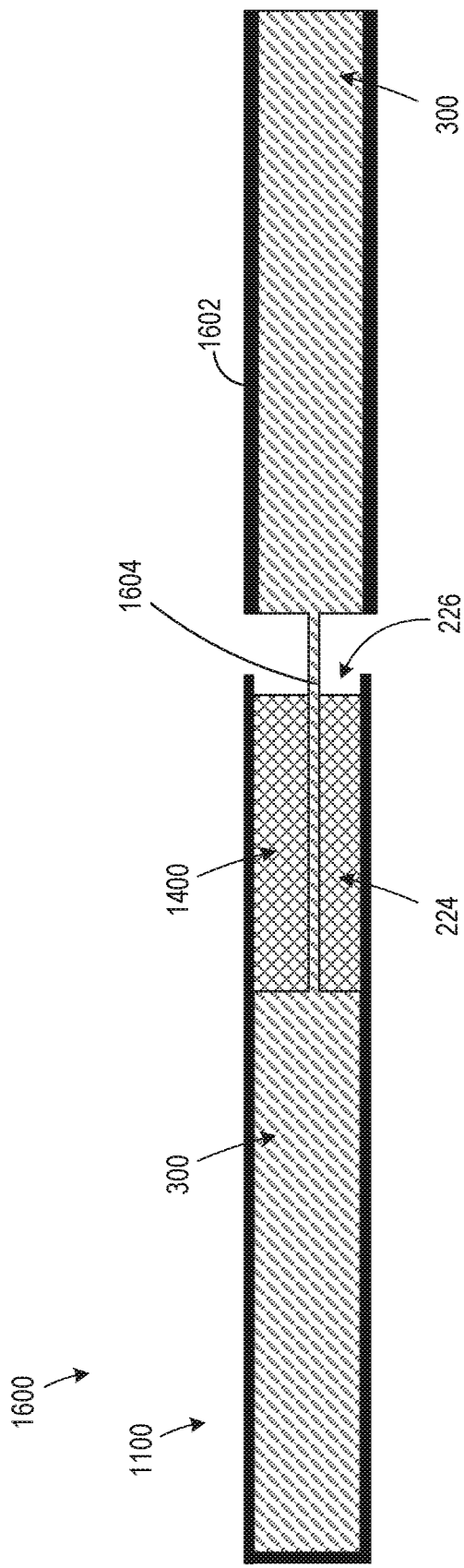

WASHERS FOR INDICATING IMBALANCED LOADING AND METHODS OF MAKING THE SAME

FIELD OF THE DISCLOSURE

This disclosure relates generally to washers and, more particularly, to washers for indicating imbalanced loading and methods of making the same.

BACKGROUND

In many structural applications, particularly in aerospace applications, local load paths at attachment points often require efficient local strengthening and support. Washers are often used when attaching structural members to each other. For instance, a washer may be used in conjunction with a fastener to distribute the load from the fastener over a larger area.

SUMMARY

An example washer disclosed herein includes an outer conical wall having a first end and a second end opposite the first end, an inner conical wall concentric with the outer conical wall, the inner conical wall spaced apart from the outer conical wall, the inner conical wall having a first end and a second end opposite the first end, the inner conical wall defining a central bore through the washer, an end wall between the second ends of the outer conical wall and the inner conical wall, such that a cavity is formed between the outer conical wall, the inner conical wall, and the end wall, and an opening to the cavity is formed between the first ends of the outer conical wall and the inner conical wall, and a viscoelastic material disposed in the cavity, the viscoelastic material to protrude from the opening when the outer conical wall and the inner conical wall are moved toward each other.

An example aircraft disclosed herein includes a support having a threaded opening, a panel having a countersunk opening defined by a tapered surface, a washer in the countersunk opening of the panel, the washer including: a body engaged with the tapered surface, the body having a first end and a second end opposite the first end, the first end defining an annular opening into a cavity, and a viscoelastic material disposed in the cavity, and a threaded fastener extending through the central bore and into the threaded opening, the threaded fastener to couple the panel to the support, the viscoelastic material to protrude from the annular opening in response to excessive load between the threaded fastener and the panel.

An example method disclosed herein includes printing, via a three-dimensional (3D) printer, a washer body, the washer body including: an outer conical wall having a first end and a second end opposite the first end, an inner conical wall concentric with the outer conical wall, the inner conical wall spaced apart from the outer conical wall, the inner conical wall having a first end and a second end opposite the first end, the inner conical wall defining a central bore through the washer, and an end wall between the second ends such that a cavity is formed between the outer conical wall, the inner conical wall, and the end wall, an opening to the cavity is formed between the first ends of the outer conical wall and the inner conical wall, and adding a viscoelastic material to the cavity.

BRIEF DESCRIPTION OF THE DRAWINGS

FIG. 3 is a cross-sectional view of the example washer of FIG. 2.

FIG. 4 is top view of the example washer of FIG. 2.

FIG. 14 shows an example honeycomb structure in the example segment of FIG. 11.

FIG. 15 shows an example force on the example segment in FIG. 14.

FIG. 16 illustrates an example technique of adding example viscoelastic material to the example segment of FIG. 14.

Figure 1:
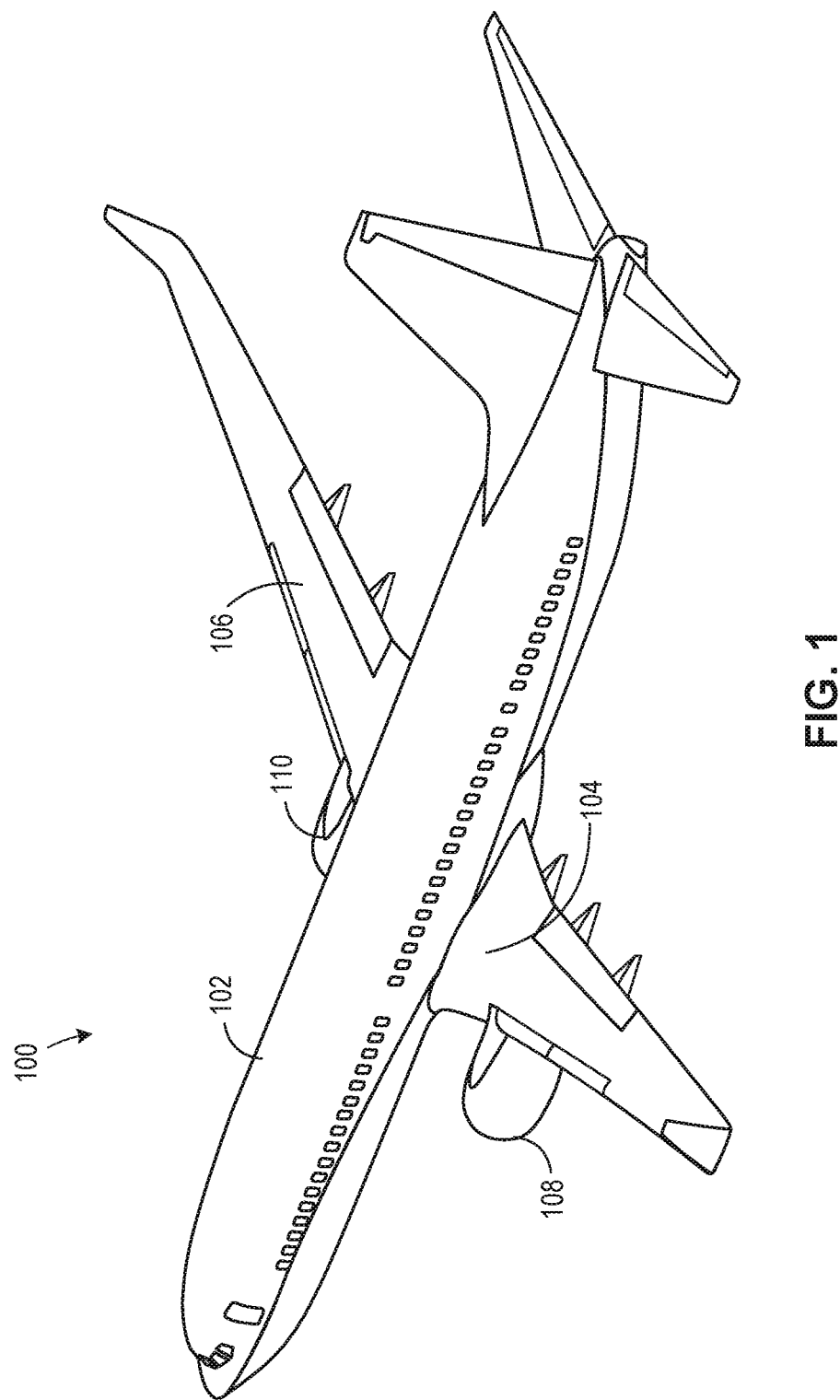
FIG. 1 illustrates an example aircraft in which examples disclosed herein can be implemented.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Disclosed herein are example chambered washers for indicating imbalanced loading and methods of making such washers. The example washers disclosed herein can be used on a vehicle, such as an aircraft. For example, many aircraft panels are coupled to underlying structural members with fasteners (e.g., a screw or bolt) and washers. However, a fastener can disrupt the load balance of an aircraft panel. For example, during assembly, maintenance, or flight of an aircraft, an aircraft panel can become misaligned to its corresponding structural member such that the holes on the panel are offset from the holes on the support. Then, a fastener positioned within the misaligned assembly can create a stress concentration in that area of the panel. Additionally, aligned aircraft panels, supports, and fasteners can create load imbalances on an aircraft panel. For example, sections of a fuselage can expand and contract over time (e.g., fuselage stretch) as the aircraft is exposed to different pressure gradients, causing additional stress on components of the aircraft. Stress localized at fasteners can create stress concentration zones and potential failure modes for aircraft panels.

Some prior techniques to detect imbalanced loading involve applying paint and/or ink to the underside of a head of a fastener, causing the fastener to mark the panel at the locations of the misalignment. However, this technique requires removing the fastener to see the paint marks. Further, the paint is often smeared while installing or uninstalling the fasteners, which renders the process useless.

Disclosed herein are example chambered washers to indicate load imbalances on structural components, such as on a panel of an aircraft. In some examples, the chambered washer is conical-shaped, referred to here as a conical washer. The conical washer has a body with a first end, a second end opposite the first end, and a central bore through the body to receive a fastener. The first end has an opening to a cavity or chamber defined in the body. For example, the body can include an outer conical wall, an inner conical wall, and an end wall (which forms the second end of the body). The cavity is formed between the outer conical wall, the inner conical wall, and the end wall, and the opening to the cavity is defined between the first and second conical walls at the first end. In examples disclosed herein, a viscoelastic material is disposed in the cavity. The viscoelastic material is a material that remains compliant or elastic, and does not harden. The viscoelastic material can be implemented by rubber cement and/or a silicone-based material, for example. In some examples, the viscoelastic material is dyed a bright color. If there is a load imbalance on the washer, such as if the fastener is misaligned with the panel opening or support opening, the outer conical wall and the inner conical wall are moved toward each other in the direction of the excessive load, which squeezes the viscoelastic material out of the opening on the first end of the body in the area of the compression. This provides a visual indication to a person that a potential load imbalance has occurred. Therefore, the examples disclosed herein provide relatively quick and effective verification of load balances on an aircraft panel, without having to remove the fastener and washer. Further, examples disclosed herein enable washers to indicate misalignment and/or excessive load on aircraft panels over the life of the aircraft, thereby increasing the safety, reliability, and life of the panel. Also, examples disclosed herein can be implemented as a temporary check for fastener alignment and/or can remain in a panel over time to indicate panel fatigue.

FIG. 1 illustrates an example aircraft 100 in which the examples disclosed herein can be implemented. The aircraft 100 includes a fuselage 102, a first wing 104 coupled to the fuselage 102, and a second wing 106 coupled to the fuselage 102. In the illustrated example, the aircraft 100 includes a first engine 108 carried by the first wing 104 and a second engine 110 carried by the second wing 106. The engines 108, 110 generate propulsive thrust to fly the aircraft 100. In other examples, the aircraft 100 may include only one engine or may include more than two engines. The engine(s) can be carried on the first and/or second wings 104, 106 and/or another structure on the aircraft 100 (e.g., on the tail section of the fuselage 102).

The aircraft 100 includes multiple panels (sometimes referred to as the skin) that form the outer surfaces of the fuselage 102, the wings 104, 106, and the engines 108, 110. The panels are coupled to underlying structural members (e.g., ribs, spars, etc.) via threaded fasteners (e.g., bolts, screws) and washers. The example washers disclosed herein can be used with threaded fasteners to couple such panels to the underlying structural members. The example washers disclosed herein can also be used in connection with any other fasteners on any other part of component (e.g., an internal structural member) of the aircraft 100.

Figure 2:
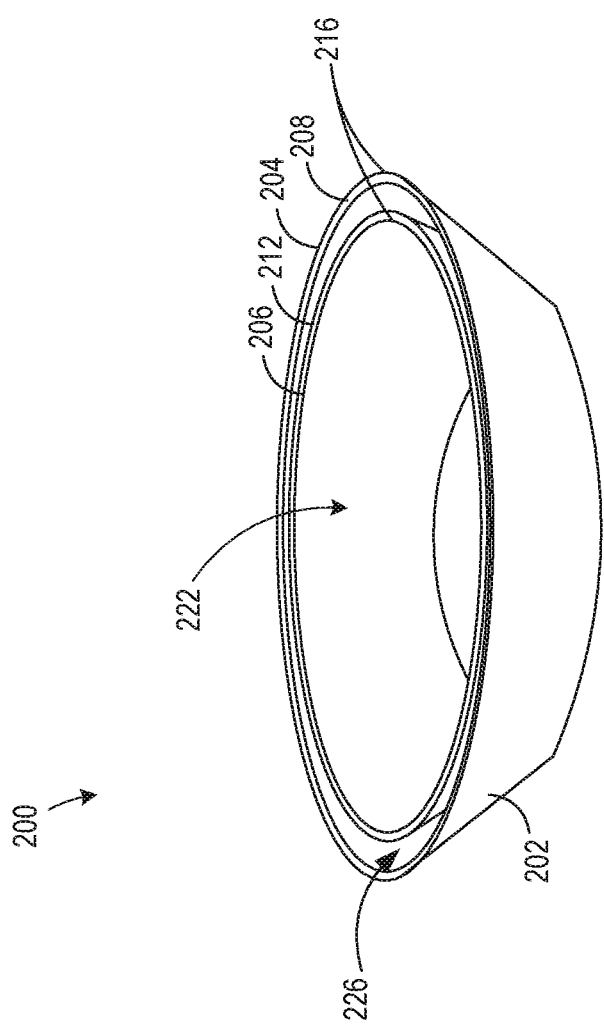
FIG. 2 is a perspective view of an example conical washer that can be used in connection with the example aircraft of FIG. 1 and which is constructed in accordance with the teachings of this disclosure.

FIGS. 2 and 3 illustrate an example washer 200 constructed in accordance with the teachings of this disclosure. FIG. 2 is a perspective view of the example washer 200, and FIG. 3 is a cross-sectional view of the example washer 200. The washer 200 can also be referred to as a chambered washer. The example washer 200 (or multiple ones of the washer 200) can be implemented in the aircraft 100 of FIG. 1. In the illustrated example of FIGS. 2 and 3, the washer 200 includes a body 202. In this example, the body 202 having a conical or truncated conical shape and, thus, may be referred to as a conical washer. In the illustrated example, the body 202 includes an outer conical wall 204 and an inner conical wall 206 concentric with the outer conical wall 204. The outer conical wall 204 has a first end 208 and a second end 210 (FIG. 3) opposite the first end 208. The inner conical wall 206 has a first end 212 and a second end 214 (FIG. 3) opposite the first end 212. The first ends 208, 212 form a first end 216 (also referred to as a top or top end) of the body 202 and the second ends 210, 214 form a second end 218 (FIG. 3) (also referred to as a bottom or bottom end) of the body 202 opposite the first end 216. The inner conical wall 206 defines a central bore 222 through the body 202 of the washer 200.

As shown in FIG. 3, the body 202 includes an end wall 220 between the second ends 210, 214 of the outer conical wall 204 and the inner conical wall 206. The inner conical wall 206 is spaced apart from the outer conical wall 204 such that a chamber or cavity 224 is formed between the outer conical wall 204, the inner conical wall 206, and the end wall 220. An opening 226 (FIGS. 2 and 3) to the cavity 224 is formed between the first ends 208, 212 of the walls 204, 206. Said another way, the first end 216 of the body 202 has the opening 226 to the cavity 224. The opening 226 is annular or circular shaped.

In some examples, the body 202 is constructed of a single unitary part or component (e.g., a monolithic structure). For example, the outer conical wall 204, the inner conical wall 206, and the end wall 220 can be integrally formed. In some examples, the outer conical wall 204, the inner conical wall 206, and the end wall 220 are composed of multiple layers of the same material bonded together, such as by a three-dimensional (3D) printing process. In other examples, the body 202 can be formed by another manufacturing method, such as machining or stamping. In some examples, the body 202 is constructed of metal, such as steel or aluminum. Additionally or alternatively, the body 202 can be constructed of other materials.

In the illustrated example of FIGS. 2 and 3, the inner conical wall 206 and the outer conical wall 204 taper or angle inwards from the first ends 208, 212 to the second ends 210, 214. In some examples, the walls 204, 206 are shaped (e.g., sized) based on a shape of an opening (e.g., a countersunk through hole) on an aircraft panel such that at least a portion of the washer 200 extends into the panel, further described in detail in conjunction with FIGS. 7-9.

As shown in FIG. 3, the example washer 200 includes an example viscoelastic material 300 in the cavity 224. In some examples, the viscoelastic material 300 is rubber cement and/or silicone. When the washer 200 is unloaded (or loaded below a threshold amount), as shown in FIG. 3, the viscoelastic material 300 is below the first ends 208, 212 of the walls 204, 206. However, when an imbalanced force (or an excessively high balanced force) occurs on the washer 200, such as when there is misalignment between the threaded fastener and one or both of the holes in the panel and underlying structure, the viscoelastic material 300 moves toward and protrudes outward from the opening 226. For example, when an imbalanced loading occurs on the body 202 (or an excessively high balanced loading occurs), the walls 204, 206 move toward each other, which causes the example viscoelastic material 300 to be forced (e.g., pushed, squeezed, acted upon, etc.) toward the opening 226 and, in some examples, protrudes outward from the opening 226. In some examples, the viscoelastic material 300 is compressed uniformly or nonuniformly within the cavity 224, as described in further detail below in conjunction with FIGS. 11-13. The viscoelastic material 300 is a material that remains in a compliant or elastic state. Therefore, when the load is removed, the viscoelastic material 300 contracts back into the cavity 224. This example movement/effect can occur multiple times.

The viscoelastic material 300 can be seen when looking at the washer 200 (e.g., at the first end 216 of the washer 200), which provides a visual indicator that imbalanced loading (or excessively high loading) has occurred. In some examples, to enhance this visual indication, the viscoelastic material 300 is brightly colored. For example, the viscoelastic material 300 can include a bright colored dye (e.g., red, green, etc.).

As used herein, the terms "balanced load", "balanced force", "uniform load", "uniform force," and/or variations thereof refer to a load (e.g., force) that is uniform or substantially uniform in all directions. For example, a balanced load on the washer 200 exerts equal magnitudes of load in all radial directions around the washer 200. As used herein, "imbalanced load", "unbalanced load", "non-uniform load", "non-uniform force", "imbalanced force", "unbalanced force" and/or variations thereof refer to a load (e.g., force) that is greater in one direction or area (e.g., region, section, etc.) than another. For example, an imbalanced load on the washer 200 exerts a first magnitude of load at a first radial direction of the washer 200 and a second magnitude of load at a second radial direction of the washer 200, the second radial direction different from the first radial direction, the second magnitude greater than the first magnitude.

FIG. 4 is a top view of the example washer 200 showing the opening 226 to the cavity 224 defined between the outer conical wall 204 and the inner conical wall 206. When the washer 200 is unloaded, the viscoelastic material 300 (FIG. 3) is not visible from the opening 226. For example, referring to FIG. 3, the viscoelastic material 300 is at a level in the cavity 224 where the viscoelastic material 300 is not visible from the first end 216 because of the tapered overhand of the inner conical wall 206. However, when an imbalanced force (or an excessively high force) occurs on the washer 200, the viscoelastic material 300 moves toward and protrudes from the opening 226, which can be seen when looking at the washer 200 from the first end 216 of the washer 200. This serves as a visual indicator that an imbalanced force or an excessively high force has occurred. For example, if there is an imbalanced load on the washer 200, the viscoelastic material 300 in the area of the higher load protrudes toward the opening 226 (while the viscoelastic material 300 in the lower load remains below the opening 226). This not only indicates an imbalanced load has occurred, but also the area or direction of the imbalanced load.

Figure 6:
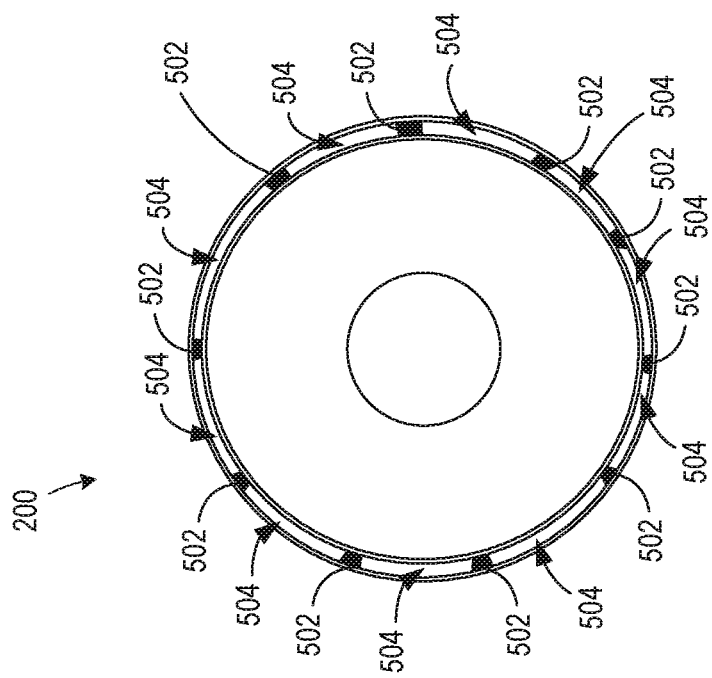
FIG. 6 is a top view of the example washer of FIG. 5.
Figure 5:
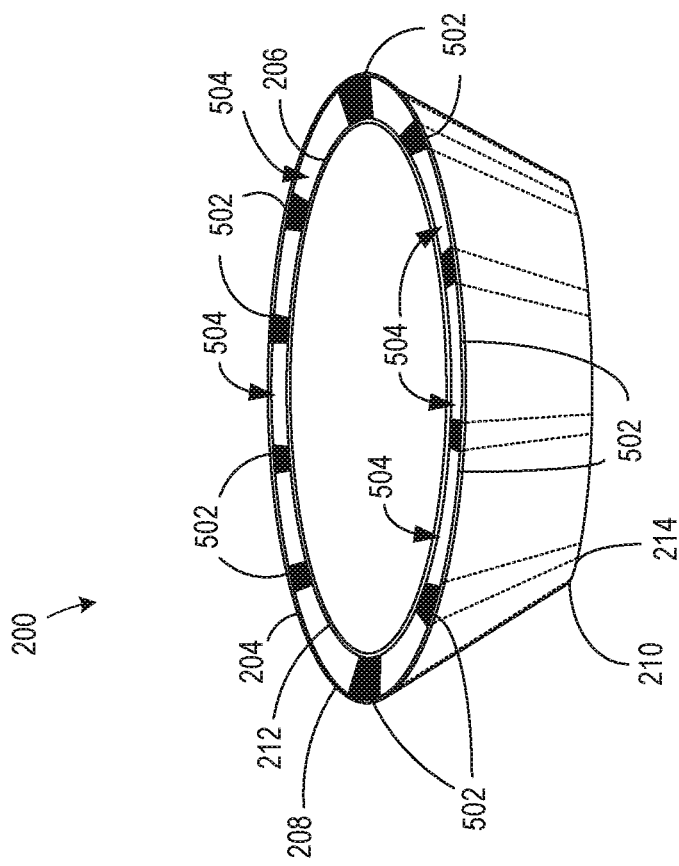
FIG. 5 is a perspective view of the example washer of FIG. 2 having example channel walls.

In some examples, the washer 200 can include one or more channel walls. For example, FIG. 5 is a perspective view of the example washer 200, and FIG. 6 is a plan view of the example washer 200. In this example, the washer 200 includes channel walls 502 distributed throughout the cavity 224. The channel walls 502 are positioned between the inner conical wall 206 and the outer conical wall 204. For example, ones of the channel walls 502 extend laterally from the inner conical wall 206 to the outer conical wall 204 and longitudinally from the second ends 210, 214 to the first ends 208, 212. The example channel walls 502 separate the cavity into multiple cavity sections 504. In some examples, the inner conical wall 206, the outer conical wall 204, and the channel walls 502 taper from the first ends 208, 212 to the second ends 210, 214.

In some examples, the example viscoelastic material 300 can be disposed within each of the multiple cavity sections 504. The channel walls 502 can help maintain the viscoelastic material 300 in the designated radial areas of the washer 200. In some examples, the channel walls 502 are compliant or flexible. In some examples, the viscoelastic material 300 can protrude from the opening 226 from different ones of the multiple cavity sections 504. For example, a first one of the multiple cavity sections 504 can have a first amount of the viscoelastic material 300 protrude from the opening 226 (FIG. 2) and a second one of the multiple cavity sections 504 can have a second amount of the viscoelastic material protrude from the opening 226, the first amount greater than the second amount based on at least a location (e.g., direction, radial direction, etc.) of an external force on the washer 200. Thus, the washer 200 can indicate a direction of misalignment (e.g., excessive force, misplacement, etc.) based on an amount of the viscoelastic material protruding from the opening 226. In some examples, the washer 200 can indicate a true alignment (e.g., balanced forces) when the viscoelastic material 300 remains within the cavity 224, ones of the multiple cavity sections 504, and/or the opening 226.

Figure 7:
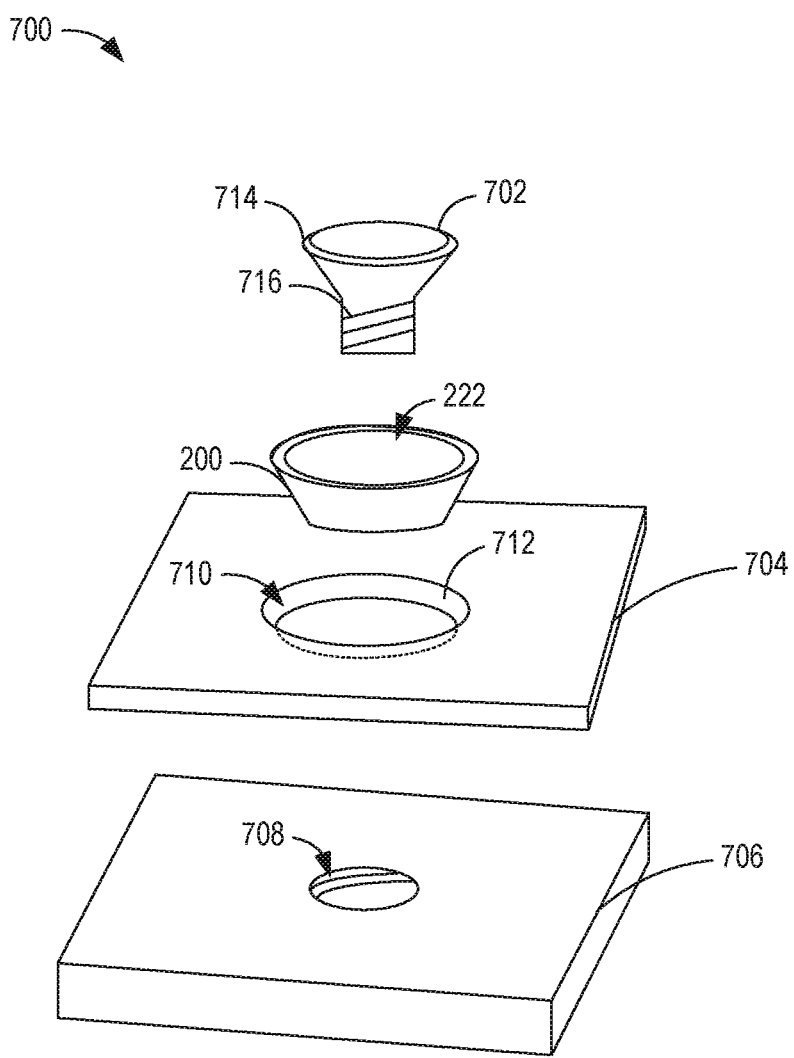
FIG. 7 is an exploded view of an example assembly using the example washer of FIG. 2.

FIG. 7 is an exploded view of an example assembly 700 that uses the example washer 200. The example assembly 700 includes a threaded fastener 702 (e.g., a screw), a panel 704, a support 706, and the washer 200. The panel 704 can correspond to any panel on the example aircraft 100 (FIG. 1), and the support 706 can correspond to any member that the panel 704 is to be coupled to, such as a rib, a spar, etc.

The example support 706 includes a threaded opening 708 to receive the threaded fastener 702. The panel 704 includes a countersunk opening 710 having a tapered surface 712. When the fastener 702 and the washer 200 are installed, the example washer 200 is positioned (e.g., aligned) within the countersunk opening 710 in the panel 704, such that the outer conical wall 204 (FIG. 2) of the washer 200 engages the tapered surface 712.

The example threaded fastener 702 has a head 714 and a threaded section 716. When the threaded fastener 702 and the washer 200 are installed, the fastener 702 extends through the central bore 222 and into the threaded opening 708, such that the threaded section 716 is screwed into the threaded opening 708 and the head 714 engages the inner conical wall 206 of the washer 200. This clamps the panel 704 between the threaded fastener 702 and the support 706 and thereby couples the panel 704 to the support 706. In some examples, the fastener 702 is tightened to a specific torque. In some examples, the washer body 202 (FIG. 2) is constructed such that when the threaded fastener 702 is torqued to the specific torque, and the load is uniformly distributed to the washer 200, the outer and inner conical walls 204, 206 (FIG. 2) do not move toward each other to squeeze out the viscoelastic material. However, if the threaded fastener 702 is misaligned with one or both of the openings 708, 710, this specific torque may induce a higher load/force on a certain section of the panel 704 and, thus, on a certain radial area of the washer 200. In response to this unbalanced load, the viscoelastic material 300 protrudes from the opening 226 (FIG. 2). This unbalanced loading can occur because of misalignment between the fastener 702, the washer 200, the support 706, and/or the panel 704. Additionally or alternatively, this unbalanced loading can occur if there is excessive lateral loading on the panel 704, such as during flight. When unbalanced loading occurs, the viscoelastic material 300 protrudes from the opening 226. In some examples, the viscoelastic material 300 only protrudes from the opening 226 in the radial sector where the excessive loading occurs, which can indicate the general direction of the excessive loading. Further, if the loading is balanced but excessive (e.g., torqued beyond the specific torque), the viscoelastic material 300 may protrude from the opening 226 in all areas, thereby indicating the fastener 702 may have been over-torqued.

Figure 8:
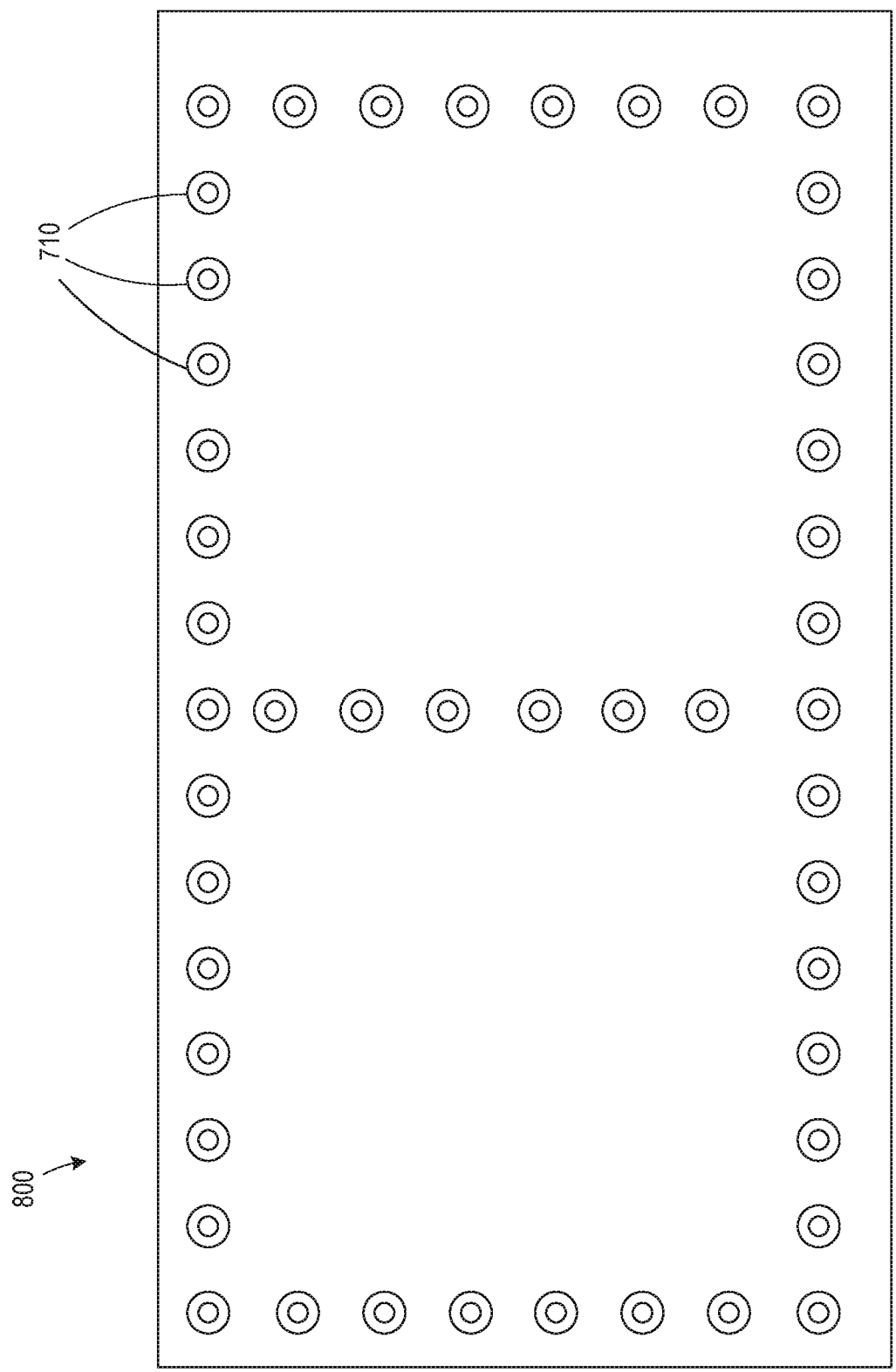
FIG. 8 is an example panel in which examples disclosed herein can be implemented.

FIG. 8 is an example panel 800 constructed in accordance with the teachings of this disclosure. The example panel 800 of FIG. 8 can correspond to the example panel 704 of FIG. 7, but includes a plurality of the countersunk openings 710 (three of which are referenced in FIG. 8) distributed throughout the panel 800. The openings 710 can be arranged in various configurations based on the location of the underlying the structure and the loading requirements. Multiple ones of the fasteners 702 and the washer 200 can be inserted into the openings 710 to couple the panel 800 to an underlying structure. The example panel 800 (e.g., fuselage panel, wing panel, etc.) can be made of aluminum, titanium, graphite composite material, silicon composite materials, glass composite materials, and/or materials. In some examples, the panel 800 is a fitted panel. However, the example panel 800 can be a non-fitted panel.

Figure 9:
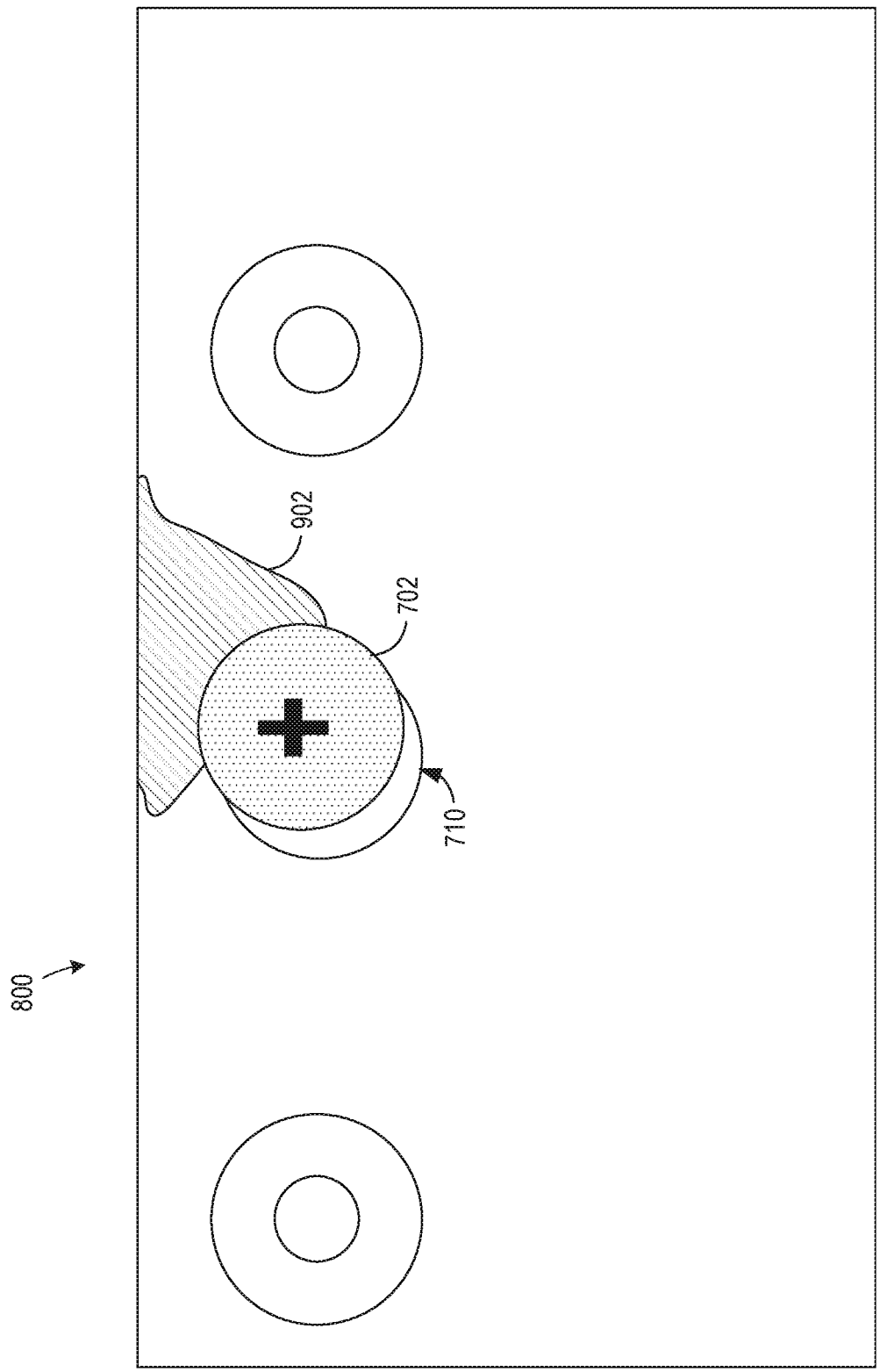
FIGS. 9 and 10 are detailed views of the example panel of FIG. 8.

FIG. 9 is an enlarged view of the example panel 800 showing the fastener 702 in one of the openings 710. In this example, an example washer 200 is not used. Instead, the head 714 of the fastener 702 is engaged directly with the panel 800. In the example of FIG. 9, the fastener 702 is misaligned with the opening 710. This may be caused by the panel 800 being misaligned with the corresponding holes in the underlying support. The misalignment causes the fastener 702 to exert excessive force on the panel 800 in the direction of misalignment. For example, the excessive force exerted on the panel 800 by the misaligned fastener 702 is shown at stress zone 902. The example stress zone 902 can result in multiple failure modes for the panel 800 such as a crack (e.g., fracture) in a surface of the panel 800.

Figure 10:
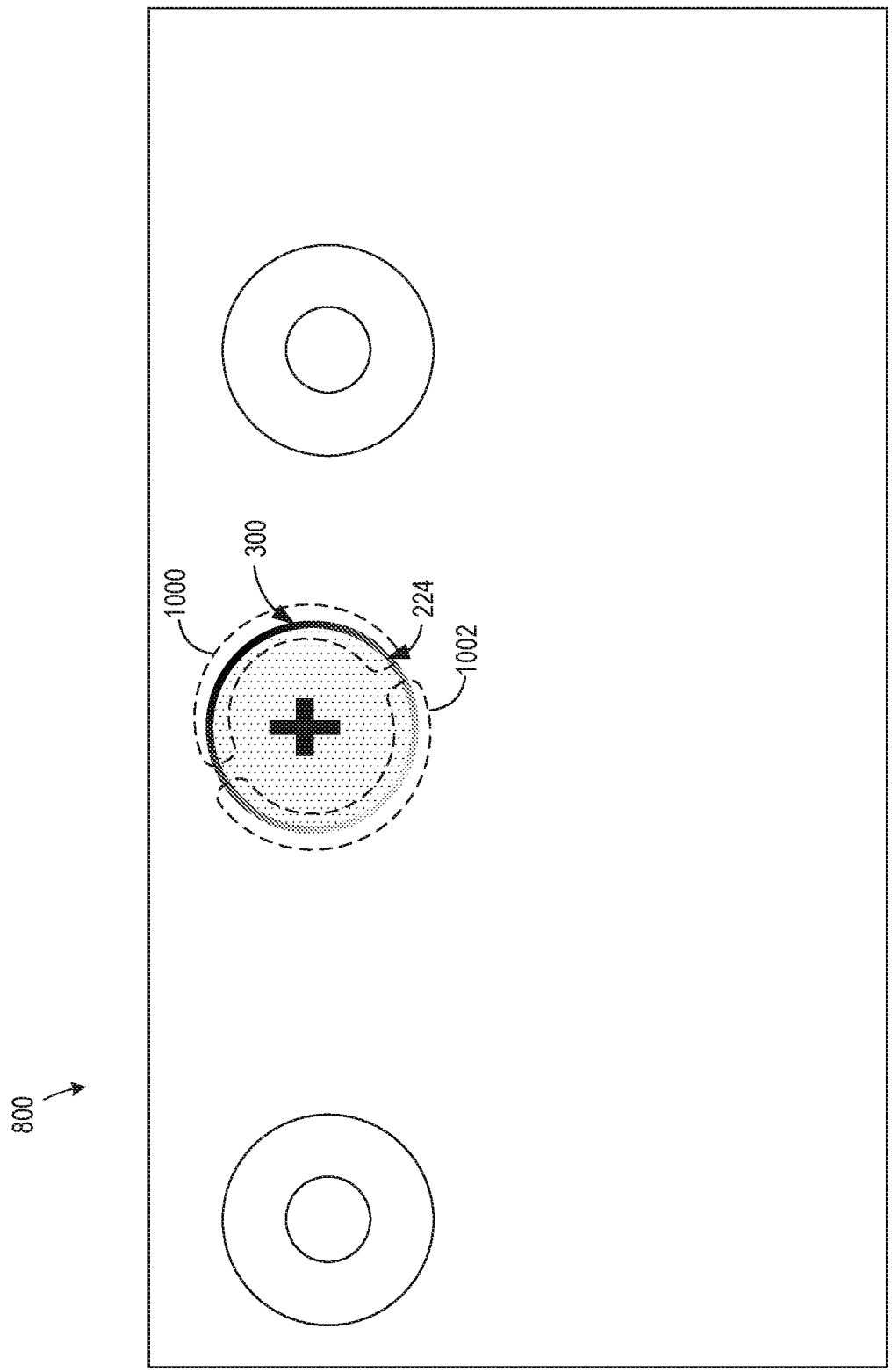

FIG. 10 is another view of the example panel 800 of FIG. 9 but, in this example, also includes the example washer 200. In particular, FIG. 10 includes a representation of the viscoelastic material 300 in the cavity 224 of the washer 200. In the example of FIGS. 9 and 10, the misaligned fastener 702 exerts a force on the panel 800. The misaligned washer 200 can indicate the misalignment via the viscoelastic material 300. For example, the viscoelastic material 300 protrudes from the cavity 224 due to compression from the panel 800. Thus, as depicted in shaded region 1000 of the cavity 224, the viscoelastic material 300 is forced (e.g., pushed, squeezed, etc.) out from the cavity 224 to at least a surface of the washer 200. In some examples, the viscoelastic material 300 can include bright colored dye. Additionally or alternatively, the viscoelastic material 300 remains within the cavity 224 when it does not undergo compression from the panel 800. Thus, as depicted in unshaded region 1002 of the cavity 224, the viscoelastic material 300 remains within the cavity 224.

Figure 11:
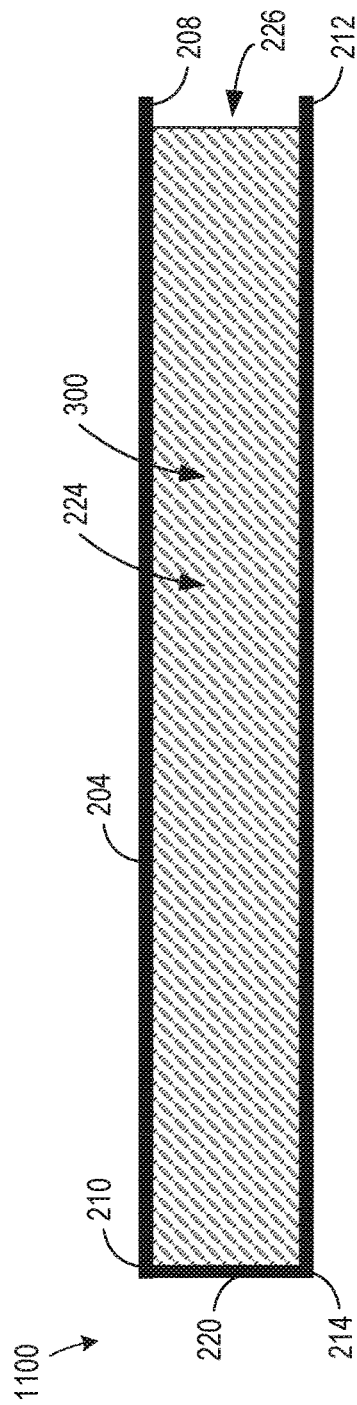
FIG. 11 illustrates an example segment of the example washer of FIG. 2.
Figure 12:
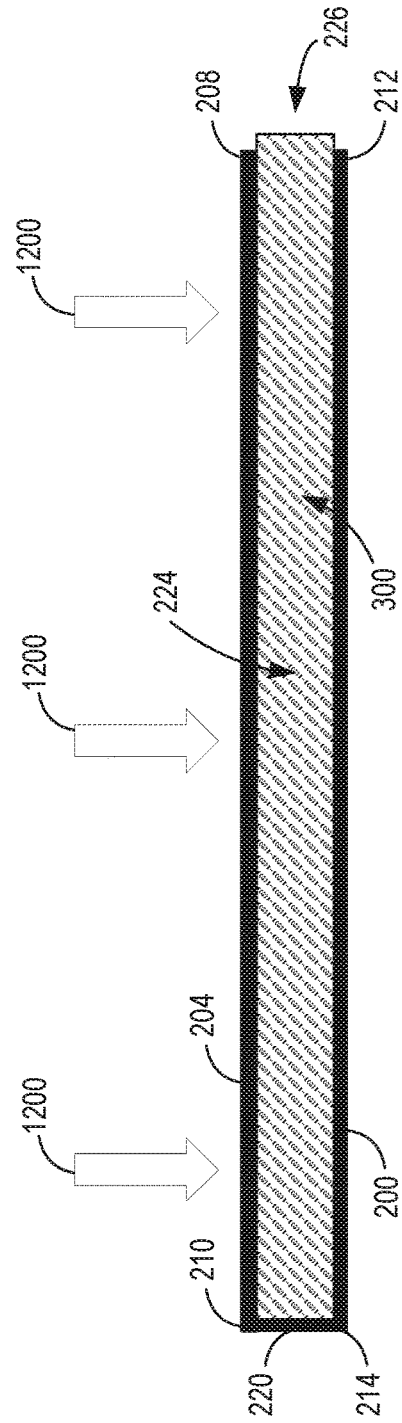
FIG. 12 shows an example force on the example segment of FIG. 11.
Figure 13:
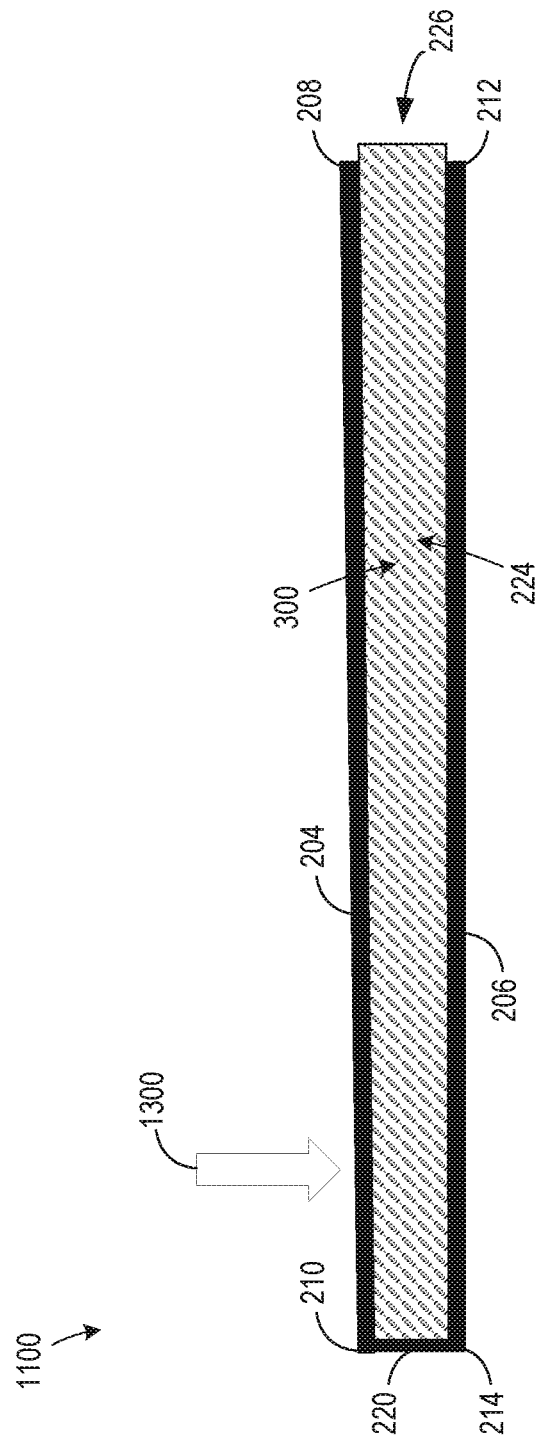
FIG. 13 shows an example force on the example segment of FIG. 11.

FIGS. 11-13 show example scenarios of operation of the viscoelastic material 300 in response to certain forces. FIG. 11 is a cross sectional view of an example segment 1100 of the example cavity 224. The example segment 1100 includes the inner conical wall 206, the outer conical wall 204, the end wall 220, the first ends 208, 212, the second ends 210, 214, and the viscoelastic material 300. In this example, the walls 204, 206 and the cavity 224 are shown as rectilinear instead of a tapered conical shape. However, the same principles apply to the different shapes. In the example of FIG. 11, the segment 1100 is not under compression from an external force (e.g., force from the threaded fastener 702 and/or the panel 800). Thus, the viscoelastic material 300 remains within the cavity 224 (e.g., is recessed from view from the first ends 208, 212). In some examples, the viscoelastic material 300 remaining within the cavity 224 can indicate that the load is balanced (e.g., normal load). In some examples, a balanced load on the washer 200 can indicate alignment between the panel 704, the support 406, and/or the fastener 702.

FIG. 12 is another cross-sectional view of the example segment 1100 of the example cavity 224. The example segment 1100 of FIG. 12 is similar to the example segment 1100 of FIG. 11, but, instead, includes a force 1200 exerted on the outer conical wall 204. In this example, the force 1200 is even or uniforms along the section of the outer conical wall 204 between the first end 208 and the second end 210. In some examples, the force 1200 results from assembly with the panel 800 and/or the panel 704. For example, the viscoelastic material 300 protrudes from the cavity 224 due to compression from the panel 800. However, the uniform force 1200 can be due to a misalignment of the washer 200, a misalignment of the fastener 702, and/or an excessive load between the threaded fastener 702 and the panel 704 (e.g., the panel 800). In some examples, the uniform force 1200 can cause the outer conical wall 204 and the inner conical wall 206 to move towards each other. As such, the viscoelastic material 300 protrudes from the opening 226 of the cavity 224 due to the reduction in space/area of the cavity 224. In FIG. 12, the protruded viscoelastic material 300 can indicate the misaligned washer 200 and/or the force 1200.

FIG. 13 is another cross-sectional view of the example segment 1100 of the example cavity 224. The example segment 1100 of FIG. 13 is similar to the example segment 1100 of FIGS. 11 and 12, but, instead, includes a non-uniform force 1300 (e.g., non-standard force) exerted on the outer conical wall 204. In some examples, the non-uniform force 1300 can cause the outer conical wall 204 and the inner conical wall 206 to move towards each other. In the example of FIG. 13, the viscoelastic material 300 protrudes from the cavity 224 due to the non-uniform force 1300. Additionally or alternatively, the viscoelastic material 300 extends beyond the first ends 208, 212. However, the viscoelastic material 300 can extend to the first ends 208, 212. In some examples, an amount of the viscoelastic material 300 that protrudes from the cavity 224 can be proportional to a degree of the force 1300 and/or the force 1200. For example, the higher the excessive force, the more the viscoelastic material 300 protrudes from the cavity 224.

FIG. 14 is a cross-sectional view of the example segment 1100. In this example, the washer 200 includes a honeycomb structure 1400 in the cavity 224. The honeycomb structure 1400 may form an open-cell structure. The honeycomb structure 1400 extends between the outer conical wall 204, the inner conical wall 206, and the end wall 220. As disclosed above, in some examples, the body 202 of the washer 202 is 3D printed. In some instances, the honeycomb structure 1400 is printed to support one or more of the outer conical wall 204 or the inner conical wall 206 during the printing process. In other examples, other types of lattice or mesh structures can be printed. In some examples, the honeycomb structure 1400 is compressible. The viscoelastic material 300 (FIG. 3) may fill a portion of the honeycomb structure 1400.

FIG. 15 is another cross-sectional view of the segment 1100 to show the force 1200 on the outer conical wall 204. In the example of FIG. 15, the force 1200 causes the outer conical wall 204 and the inner conical wall 207 to move towards each other. In this example, the honeycomb structure 1400 compresses under the uniform force 1200. However, the honeycomb structure 1400 remains within the cavity 224 under compression.

FIG. 16 is a cross-sectional view of the segment 1100 to show an example technique 1600 to add the viscoelastic material 300 to the cavity 224. The example technique 1600 includes using an example syringe 1602 with the viscoelastic material 300 held within a body of the syringe 1602. The example syringe 1602 includes a needle 1604. The needle 1604 is inserted through the opening 226 and into the cavity 224. The syringe 1602 is then used to push the viscoelastic material 300 into the cavity 224. In this example, the cavity 224 includes the honeycomb structure 1400. In some examples, the needle 1604 is inserted through the defined openings/pores in the honeycomb structure 1604. In other examples, the needle 1604 may puncture or break a portion of the honeycomb structure 1400. When the viscoelastic material 300 is inserted into the cavity 224, the viscoelastic material 300 fills the defines openings/pores in the honeycomb structure 1400. In other examples, the viscoelastic material 300 can be added via other techniques.

Figure 17:
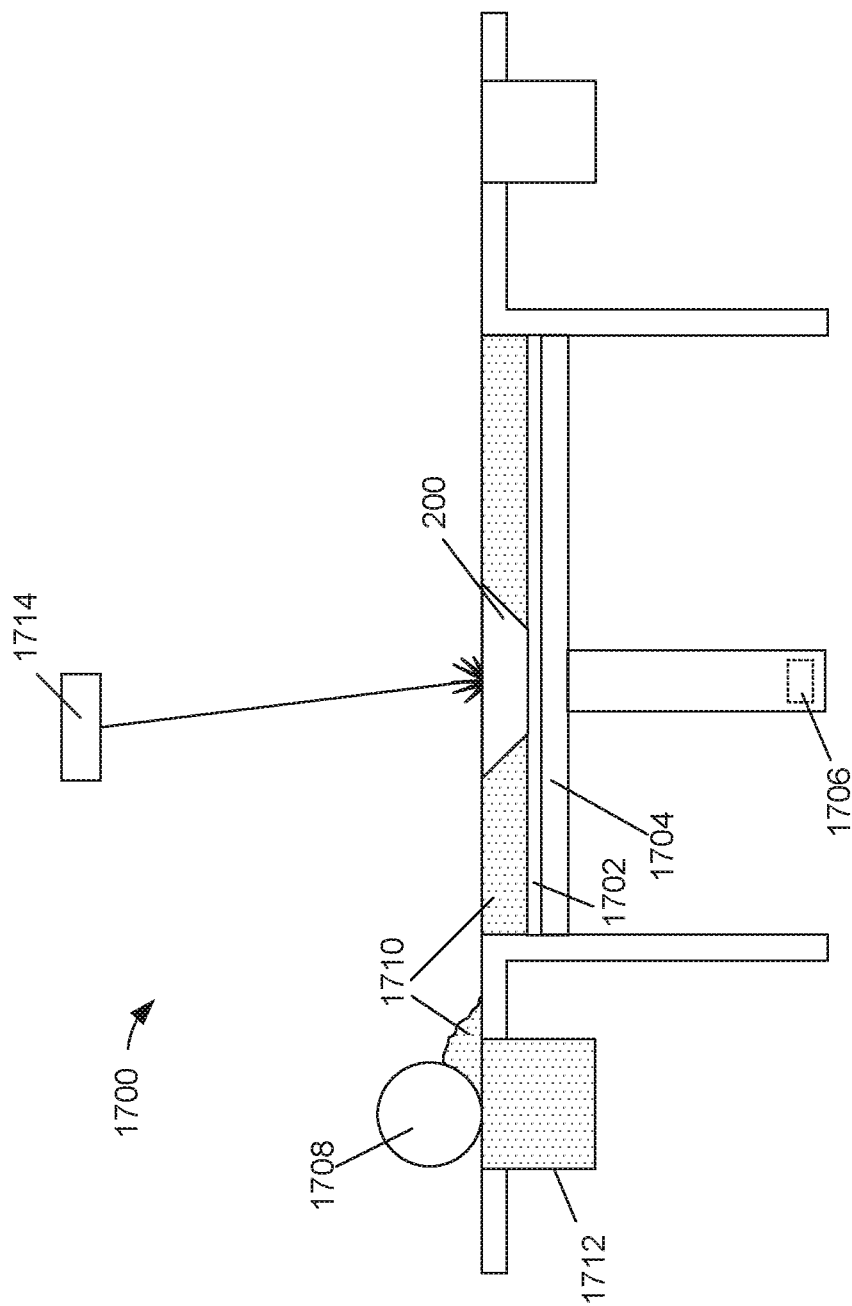
FIG. 17 illustrates an example additive manufacturing machine that may be implemented to construct the example washer of FIG. 2.

As disclosed above, the washer 200 can be manufactured using an additive manufacturing process, sometimes referred to as 3D printing. FIG. 17 illustrates an example powder bed fusion machine 1700, which is a type of additive manufacturing (AM) machine that may be utilized to create the washer 200. The powder bed fusion machine 1700 may be used to build one or more object(s) on a substrate, such as the substrate 1702. The substrate 1702 may be, for example, a metal plate. In the illustrated example, the powder bed fusion machine 1700 includes a build platform 1704 that is moveable up and down via a platform motor 1706. To create one or more washers 200, the substrate 1702 is placed on the build platform 1704. Then, a roller 1708 spreads a thin layer (e.g., 40 microns) of powder material 1710 from a reservoir 1712 (e.g., a hopper) over a top of the substrate 1702 and the build platform 1704. The powder material 1710 may be any metal and/or polymer based material. Then, a laser 1714 applies energy to the layer of powder material 1710 (in the shape of a cross-section of the 3D object(s) according to the build file), which sinters, fuses, and/or otherwise hardens the powder material 1710 to form a layer of the washer 200. In this example, the first layer of the washer 200 is/are welded to the substrate 1702. Next, the build platform 1704 is moved downward a small amount, (e.g., 0.1 millimeter (mm)) via the platform motor 1706, and the roller 1708 spreads another layer of the powder material 1710 over the build platform 1704 and over the first hardened layer(s). The laser 1714 then applies energy to the powder material 1710 to harden the material onto the previous layer(s). This process is repeated to build the washer 200 layer-by-layer.

The loose, unfused powder material 1710 surrounding the washer 200 on the build platform 1704 remain in position throughout the process and is removed at the end (e.g., via a de-powdering unit). Other types of powder bed fusion AM processes may be completed by a variety of techniques such as, for example, direct metal laser sintering, electron beam melting, selective heat sintering, selective laser melting, selective laser sintering, etc. Powder bed fusion methods use either a laser or electron beam to melt and fuse material powder together. While some of the examples disclosed herein are described in connection with a powder bed fusion AM machine, the examples disclosed herein can likewise be implemented with any other type of AM process or machine, such as VAT photopolymerization, material jetting, binder jetting, material extrusion, sheet lamination, and/or directed energy deposition.

Figure 18:
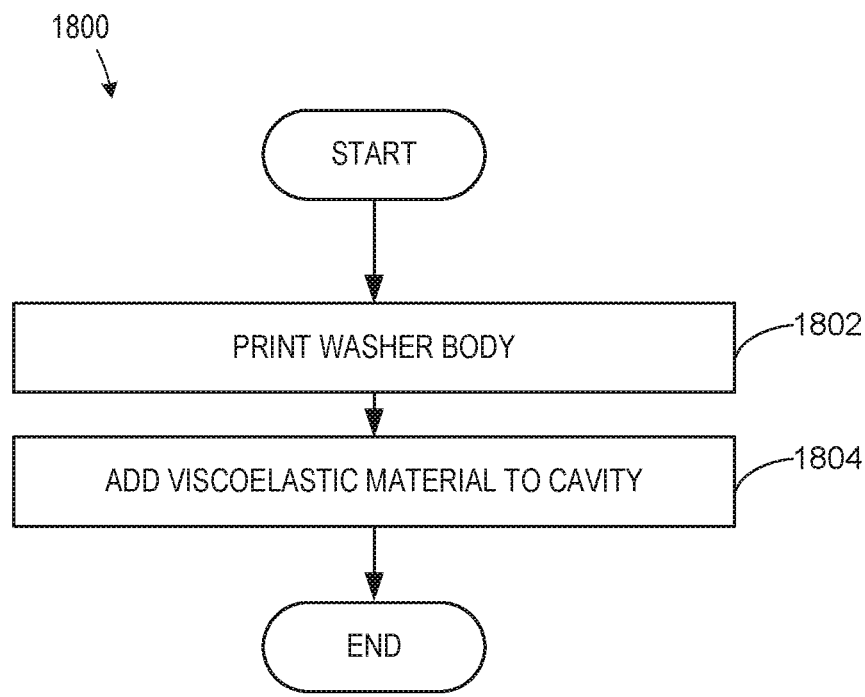
FIG. 18 is a flowchart representative of an example of constructing or manufacturing the example washer of FIG. 2.

FIG. 18 is a flowchart representative of an example method 1800 of producing or manufacturing the washer 200. At block 1802, the AM machine 1700 of FIG. 17 prints the body 202 of the washer 200. For example, the AM machine 1700 prints the outer conical wall 204, the inner conical wall 206, and the end wall 220. Therefore, the inner conical wall 206, the outer conical wall 204, and the end wall 220 are composed of multiple layers of a same material bonded together. In some examples, the AM machine 1700 prints a plurality of channel walls 502 distributed through the cavity 224. In some examples, the AM machine 1700 prints the honeycomb structure 1400 to support the inner conical wall 206 apart from the outer conical wall 204. In other examples, the body 202 can be produced or manufactured using other techniques, such as machining or stamping.

At block 1804, the viscoelastic material 300 is added to the cavity 224. In some examples, the syringe 1602 is used to dispose (e.g., add) the viscoelastic material 300 in the cavity 224. In another example, the AM machine 1700 dispenses the viscoelastic material 300 into the cavity 224.

While in some examples the washer 200 is conical shaped, in other examples, the washer 200 can be shaped differently. For example, the washer 200 could be flat or disc-shaped. In other example, the washer 200 could be cylindrical shaped, such that the washer 200 could be used as a bushing.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

From the foregoing, it will be appreciated that example systems, methods, apparatus, and articles of manufacture have been disclosed that provide a visual indication to a person that a potential load imbalance has occurred and provide relatively quick and effective verification of load imbalances on an aircraft panel, without having to remove the fastener and the washer. Further, examples disclosed herein enable washers to indicate misalignment and/or excessive load on aircraft panels over the life of the aircraft, thereby increasing the safety, reliability, and life of the panel.

Example 1 includes a washer comprising an outer conical wall having a first end and a second end opposite the first end, an inner conical wall concentric with the outer conical wall, the inner conical wall spaced apart from the outer conical wall, the inner conical wall having a first end and a second end opposite the first end, the inner conical wall defining a central bore through the washer, an end wall between the second ends of the outer conical wall and the inner conical wall, such that a cavity is formed between the outer conical wall, the inner conical wall, and the end wall, and an opening to the cavity is formed between the first ends of the outer conical wall and the inner conical wall, and a viscoelastic material disposed in the cavity, the viscoelastic material to protrude from the opening when the outer conical wall and the inner conical wall are moved toward each other.

Example 2 includes the washer of example 1, wherein the viscoelastic material is rubber cement.

Example 3 includes the washer of example 1, wherein the viscoelastic material is silicone.

Example 4 includes the washer of example 1, wherein the viscoelastic material includes bright colored dye.

Example 5 includes the washer of example 1, wherein the inner conical wall, the outer conical wall, and the end wall are integrally formed.

Example 6 includes the washer of example 5, wherein the inner conical wall, the outer conical wall, and the end wall are composed of multiple layers of a same material bonded together.

Example 7 includes the washer of example 6, further including a honeycomb structure between the inner conical wall and the outer conical wall.

Example 8 includes the washer of example 1, wherein the inner conical wall, the outer conical wall, and the end wall are constructed of metal.

Example 9 includes the washer of example 1, wherein the inner conical wall and the inner conical wall tapers inward from the first ends to the second ends.

Example 10 includes the washer of example 1, further including channel walls in the cavity, ones of the channel walls to extend laterally from the inner conical wall to the outer conical wall and longitudinally from the second ends to the first ends, the channel walls separating the cavity into multiple cavity sections.

Example 11 includes the washer of example 10, wherein the inner conical wall, the outer conical wall, and the channel walls taper from the first ends to the second ends.

Example 12 includes an aircraft comprising a support having a threaded opening, a panel having a countersunk opening defined by a tapered surface, a washer in the countersunk opening of the panel, the washer including a body engaged with the tapered surface, the body having a first end and a second end opposite the first end, the first end defining an annular opening into a cavity, the body defining a central bore through the washer, and a viscoelastic material disposed in the cavity, and a threaded fastener extending through the central bore and into the threaded opening, the threaded fastener to couple the panel to the support, the viscoelastic material to protrude from the annular opening in response to excessive load between the threaded fastener and the panel.

Example 13 includes the aircraft of example 12, wherein the viscoelastic material is rubber cement.

Example 14 includes the aircraft of example 12, wherein the viscoelastic material is silicone.

Example 15 includes the aircraft of example 12, wherein the viscoelastic material includes bright colored dye.

Example 16 includes the aircraft of example 12, wherein the body of the washer is composed of multiple layers of a same material bonded together.

Example 17 includes the aircraft of example 12, further including channel walls in the cavity, the channel walls separating the cavity into multiple cavity sections.

Example 18 includes a method comprising printing, via a three-dimensional (3D) printer, a washer body, the washer body including an outer conical wall having a first end and a second end opposite the first end, an inner conical wall concentric with the outer conical wall, the inner conical wall spaced apart from the outer conical wall, the inner conical wall having a first end and a second end opposite the first end, the inner conical wall defining a central bore through the washer body, and an end wall between the second ends such that a cavity is formed between the outer conical wall, the inner conical wall, and the end wall, an opening to the cavity is formed between the first ends of the outer conical wall and the inner conical wall, and adding a viscoelastic material to the cavity.

Example 19 includes the method of example 18, wherein the viscoelastic material is added via a syringe.

Example 20 includes the method of example 18, wherein the viscoelastic material is added via the 3D printer.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A washer comprising:
   an outer conical wall having a first end and a second end opposite the first end;
   an inner conical wall concentric with the outer conical wall, the inner conical wall spaced apart from the outer conical wall, the inner conical wall having a first end and a second end opposite the first end, the inner conical wall defining a central bore through the washer;
   an end wall between the second ends of the outer conical wall and the inner conical wall, such that a cavity is formed between the outer conical wall, the inner conical wall, and the end wall, and an opening to the cavity is formed between the first ends of the outer conical wall and the inner conical wall; and
   a viscoelastic material disposed in the cavity, the viscoelastic material to protrude from the opening when the outer conical wall and the inner conical wall are moved toward each other.

2. The washer of claim 1, wherein the viscoelastic material is rubber cement.

3. The washer of claim 1, wherein the viscoelastic material is silicone.

4. The washer of claim 1, wherein the viscoelastic material includes bright colored dye.

5. The washer of claim 1, wherein the inner conical wall, the outer conical wall, and the end wall are integrally formed.

6. The washer of claim 5, wherein the inner conical wall, the outer conical wall, and the end wall are composed of multiple layers of a same material bonded together.

7. The washer of claim 6, further including a honeycomb structure between the inner conical wall and the outer conical wall.

8. The washer of claim 1, wherein the inner conical wall, the outer conical wall, and the end wall are constructed of metal.

9. The washer of claim 1, wherein the inner conical wall and the inner conical wall tapers inward from the first ends to the second ends.

10. The washer of claim 1, further including channel walls in the cavity, ones of the channel walls to extend laterally from the inner conical wall to the outer conical wall and longitudinally from the second ends to the first ends, the channel walls separating the cavity into multiple cavity sections.

11. The washer of claim 10, wherein the inner conical wall, the outer conical wall, and the channel walls taper from the first ends to the second ends.

12. An aircraft comprising:
    a support having a threaded opening;
    a panel having a countersunk opening defined by a tapered surface;
    a washer in the countersunk opening of the panel, the washer including:
       a body engaged with the tapered surface, the body having a first end and a second end opposite the first end, the first end defining an annular opening into a cavity, the body defining a central bore through the washer; and
       a viscoelastic material disposed in the cavity; and
    a threaded fastener extending through the central bore and into the threaded opening, the threaded fastener to couple the panel to the support, the viscoelastic material to protrude from the annular opening in response to excessive load between the threaded fastener and the panel.

13. The aircraft of claim 12, wherein the viscoelastic material is rubber cement.

14. The aircraft of claim 12, wherein the viscoelastic material is silicone.

15. The aircraft of claim 12, wherein the viscoelastic material includes bright colored dye.

16. The aircraft of claim 12, wherein the body of the washer is composed of multiple layers of a same material bonded together.

17. The aircraft of claim 12, further including channel walls in the cavity, the channel walls separating the cavity into multiple cavity sections.

18. A method comprising:
    printing, via a three-dimensional (3D) printer, a washer body, the washer body including:
       an outer conical wall having a first end and a second end opposite the first end;
       an inner conical wall concentric with the outer conical wall, the inner conical wall spaced apart from the outer conical wall, the inner conical wall having a first end and a second end opposite the first end, the inner conical wall defining a central bore through the washer body; and
       an end wall between the second ends such that a cavity is formed between the outer conical wall, the inner conical wall, and the end wall, an opening to the cavity is formed between the first ends of the outer conical wall and the inner conical wall; and
    adding a viscoelastic material to the cavity.

19. The method of claim 18, wherein the viscoelastic material is added via a syringe.

20. The method of claim 18, wherein the viscoelastic material is added via the 3D printer.

* * * * *